United States Patent [19]

Weber et al.

[11] 3,843,075
[45] Oct. 22, 1974

[54] ROLL RATE CONTROL SYSTEM
[75] Inventors: T. Jerome Weber, Livermore; Clifford T. Yokomizo, Dublin, both of Calif.
[73] Assignee: The United States of America as represented by the United States Atomic Energy Commission, Washington, D.C.
[22] Filed: June 11, 1973
[21] Appl. No.: 369,017

[52] U.S. Cl.............................. 244/3.15, 244/3.21
[51] Int. Cl...... F42b 15/16, F42g 9/00, F42b 15/02
[58] Field of Search............................ 244/3.15, 3.21

[56] References Cited
UNITED STATES PATENTS
3,272,124   9/1966   Marsh et al.................. 244/3.21
3,373,955   3/1968   Huska......................... 244/3.21
3,690,596   9/1973   Durran et al................. 244/3.21

FOREIGN PATENTS OR APPLICATIONS
1,219,350   12/1959   France........................ 244/3.21

Primary Examiner—Benjamin A. Borchelt
Assistant Examiner—Thomas H. Webb
Attorney, Agent, or Firm—John A. Horan; Dudley W. King; Richard E. Constant

[57] ABSTRACT

A control system which adjusts the angle of fins on an aerodynamic body proportional to fluid displaced by sensing masses subjected to centrifugal forces generated by the spin of the body. The displaced fluid controls the rotation of one or more fins and is interconnected between sensing masses to provide for synchronized and uniform movement within the system.

2 Claims, 7 Drawing Figures

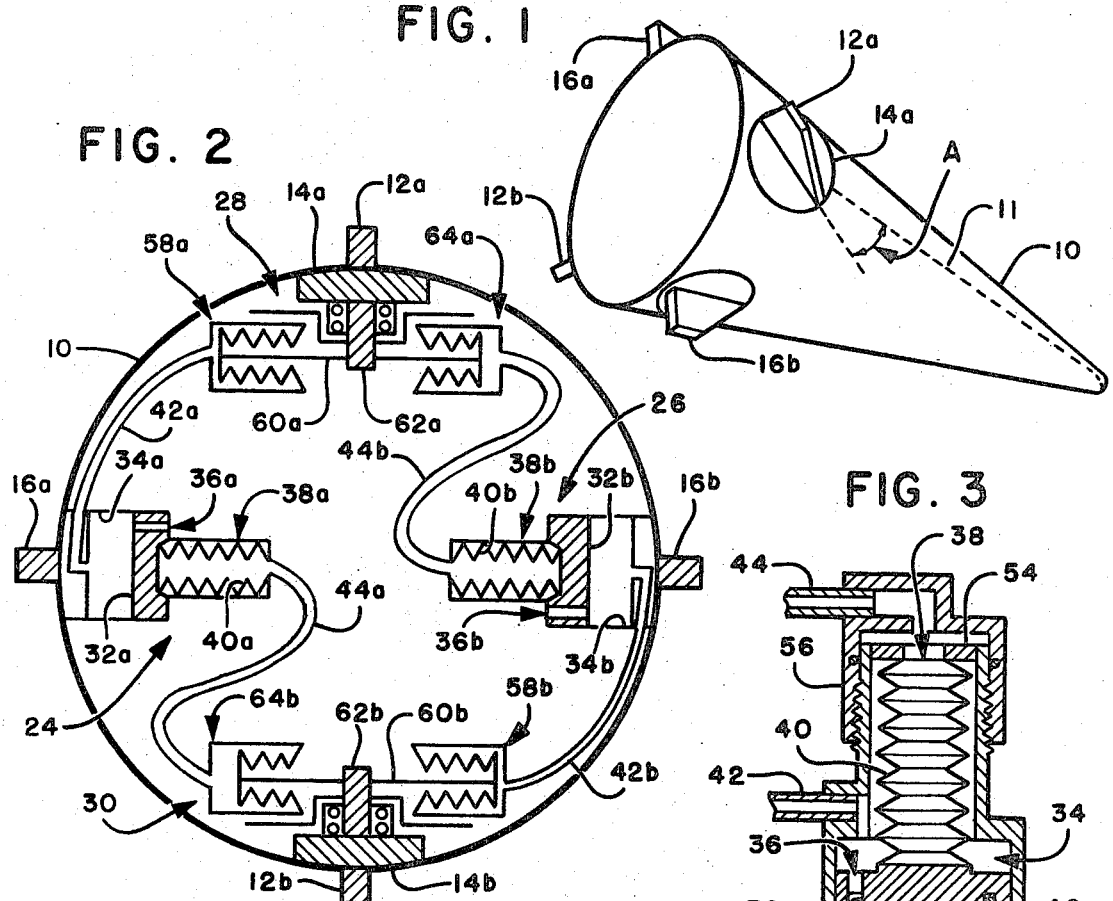
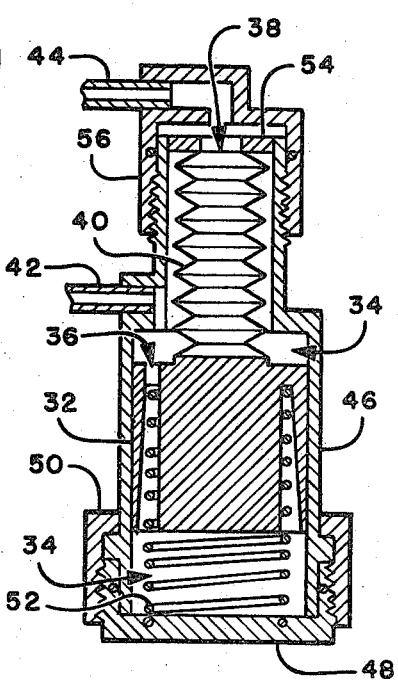
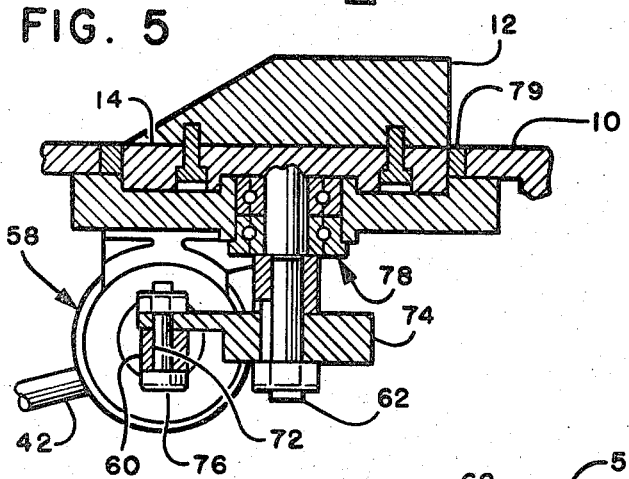
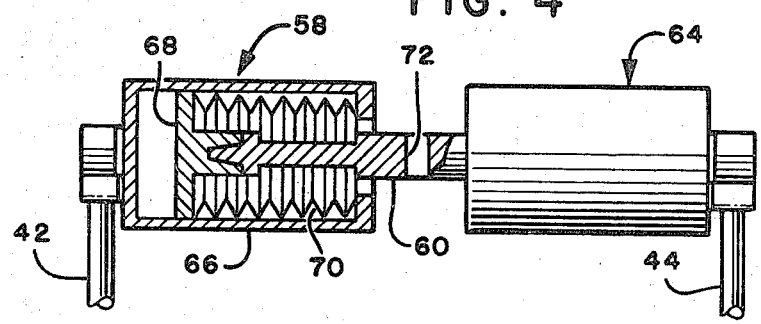

ROLL RATE CONTROL SYSTEM

BACKGROUND OF INVENTION

Aerodynamic bodies, such as reentry vehicles and missiles, are subjected to various instability effects on their flight dynamics which may produce internal destructive forces or degrade flight performance so as to prevent desired flight objectives. These effects may produce large centrifugal and centripetal forces or affect the aerodynamic body's angle-of-attack. The flight dynamics can be adversely affected by excessive or improper roll rate which in turn is easily affected by small asymmetries in the aerodynamic body. These asymmetrics may often be inherent in the body and difficult to engineer out of the body or may result from changes in the body during flight. The roll rate may "spin-up" and cause structural damage by centrifugal forces or "spin-down" to zero or small roll rates and adversely affect the flight trajectory from the lack of averaging of aerodynamic lift. It is desirable thus to control the roll of an aerodynamic body within some prescribed range by providing both spin-up and spin-down adjustments during the flight to counteract adverse effects.

Various types of active, passive and semi-passive roll rate control systems have been proposed. Active systems use an on-board energy source, sensing instrumentation and a control-actuation mechanism. In general, these active systems have been too heavy, adding too much weight to the aerodynamic body to be desirable. Passive systems attempt to use body geometry and aerodynamic effects to offset detrimental roll rate effects, however, they have not been sufficiently successful or reliable. The semi-passive types have utilized the centrifugal force of the spinning body as a power source, but, due to mechanical inefficiencies, have required a nominal roll rate of such excessively high level as to cause centrifugal forces of amplitude which may be destructive or impose such stringent structural requirements to overcome these forces that the additional weight and design restraints have been undesirable.

SUMMARY OF INVENTION

In view of the above, it is an object of this invention to provide a new roll rate control system which is effective, lightweight and relatively simple.

It is a further object of this invention to provide a control system which is relatively insensitive to lateral accelerations and coning effects.

It is a further object of this invention to provide a roll rate control system which may be operated effectively at fairly low rates.

It is a still further object of this invention to provide a roll rate control system which requires no extra power source other than the forces produced by the aerodynamic body itself.

Various other objects and advantages will appear from the following description of the invention, and the most novel features will be particularly pointed out hereinafter in connection with the appended claims. It will be understood that various changes in the details, materials and arrangements of the parts which are herein described and illustrated in order to explain the nature of the invention may be made by those skilled in the art.

The invention comprises a sensing mass arranged in an aerodynamic body to displace fluid proportional to centrifugal forces produced in the body together with means for rotating fins extending externally of said body to different cant angles proportional to the fluid displacement and in a direction to provide a desired roll rate.

DESCRIPTION OF THE DRAWINGS

The present invention is illustrated in the accompanying drawing wherein:

FIG. 1 is a perspective view of an aerodynamic body which is adapted to incorporate the features of this invention;

FIG. 2 is a diagrammatic and partially cross sectioned view of the roll rate control system of this invention showing its general location in the aerodynamic body and its relative position with respect to the control fins;

FIG. 3 is a cross sectional view of one form of the sensing mass and its fluid displacement chamber which may be utilized with the control system of FIG. 2;

FIG. 4 is an expanded view, partially in cross section, of a portion of the fin rotating apparatus which illustrates its operation;

FIG. 5 is a cross sectional view along the center of the control fin showing its placement and operation with respect to the rotating apparatus of FIG. 4;

DETAILED DESCRIPTION

Figure 6:
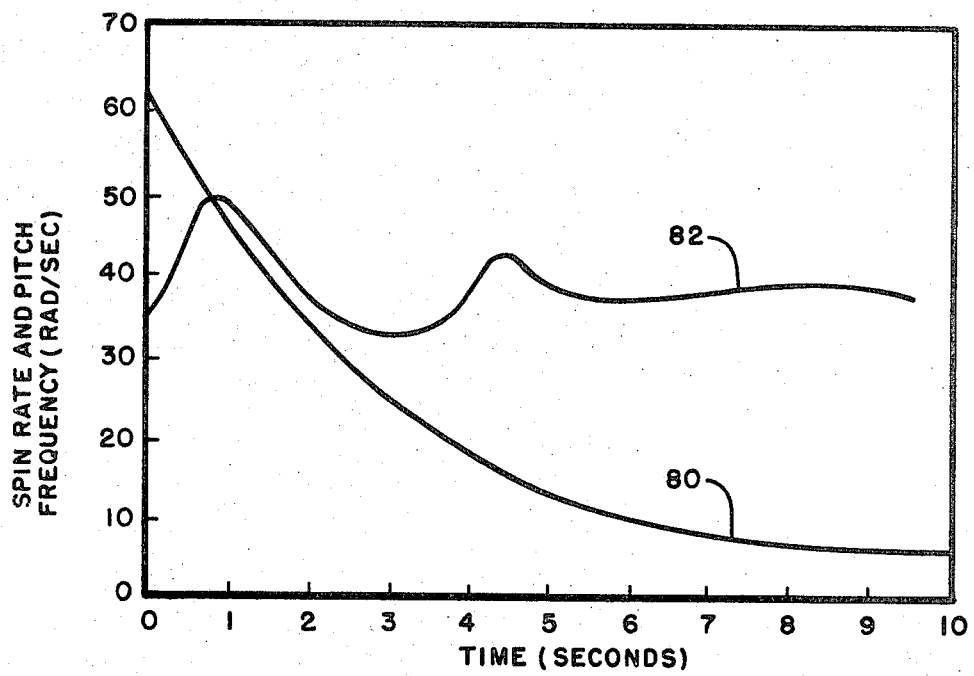
FIG. 6 is a graph of roll rate and pitch frequency of a typical aerodynamic body incorporating this roll rate control system.

An aerodynamic body which is to be conrolled by the control system of this invention may take any convenient or desired shape or size, for example, the conical reentry body or vehicle 10 shown in FIG. 1. The body 10 shown may have any desired half angle with a blunt or sharp nose and be of any desired length and base diameter. The body 10 is provided with a fin 12a which may be rotated, such as on a platform 14a, to desired orientation, angles or cant with respect to a cone ray 11 of body 10, such as at the angle A shown, or to any other angle which will provide either a spin-up or spin-down rotary force on body 10 from dynamic pressure caused by moving air to bring body 10 to the desired roll rate. Angle A is shown somewhat exaggerated for purpose of illustration, the cant typically varying less than about ±10 degrees. In conjunction with fin 12a, an additional rotatable fin 12b is provided on the opposite side of body 10 at the further extremity of a diameter thereof and mounted on a rotating platform 14b as shown in FIG. 2. In the preferred operation, the fins 12a and 12b are rotated in conjunction with each other to minimize any instabilities which might be caused by unequal adjustments of each. Further fins 16a and 16b which are generally fixed but may also be controlled, may be positioned extending from body 10 at any desired location on the body on a diameter transverse to the diameter of fins 12a and 12b. The fins 16a and 16b may be aligned with a cone ray or positioned at a fixed cant angle to induce a roll force of some desired initial level. In addition, the fins 16a and 16b may be positioned at the same longitudinal location along body 10 as fins 12a and 12b or at some other location depending on the desired aerodynamic forces to be produced by the respective fins. The use of a balanced, four fin arrangement (two controlled and two fixed fins), or other combination of appropriate balanced fins, is generaly preferred to balance the fin roll moment coefficients of the fins caused by cross-flow and angle-of-attack effects.

The fins are shown as having a generally trapezoidal-like shape as this shape has been found to produce the desired aerodynamic forces on the body 10 without undue drag. It will be understood that other shapes or configurations and positioning of the fins may be utilized or selected depending upon the shape of the aerodynamic body, the velocity at which it will travel and the atmosphere through which it will travel and other atmospheric and use conditions to which it may be subjected.

The roll control system of this invention is shown in somewhat diagrammatic and partial cross section form in FIG. 2 for a balanced four fin arrangement using two controlled and two fixed fins showing the relative positions and coaction of its elements. Fin 12b is supported on a rotatable table or platform 14b in the same manner as fin 12a. The control system shown includes first and second centrifugal force sensing and fluid displacing units 24 and 26 (referred to as drive units), apparatus 28 and 30 (referred to as slave units) responsive to fluid displacement for rotating of fins 12a and 12b, and hydraulic couplings or lines (described below) between the drive units 24 and 26 and the slave units 28 and 30. The drive units 24 and 26 are sensitive to changes in centrifugal forces created by the rolling movement of body 10 and displace fluids proportional to the change, the fluid then being transferred through the hydraulic lines to the slave units to effect movement of the respective fins in one direction or another, depending on the change in roll rate. Each of the drive units 24 and 26 are substantially identical with the same elements and function and are preferably positioned on a diameter of body 10 at either extremity, or acting in the same direction, and positioned along the length of body 10 at a location at as large a radius as convenient so as to be subjected to the largest centrifugal forces and thus increase the mechanical efficiency of the system. The drive units may be given other orientations, such as off center and parallel to a diameter, where space is a problem with some decrease in efficiency. The drive units utilize sensing masses 32a and 32b positioned within a fluid chamber 34a and 34b and adapted for back and forth movement therewithin in response to centrifugal forces along a diameter of body 10. Each of these sensing masses is provided with a damping orifice 36a and 36b to minimize movements of sensing masses 32a and 32b in response to vibrations or other extraneous forces not associated with the roll rate of body 10 and to damp the system reaction to sudden changes in aerodynamic torque. Additional chambers 38a and 38b, or chamber extensions of chambers 34a and 34b, are positioned on the inboard side of sensing masses 32a and 32b along the diameter in fluid engagement with chambers 34a and 34b. Bellows 40a and 40b, or other fluid drive mechanisms such as pistons or the like, are positioned within chambers 38a and 38b so as to move in response to movement of the sensing masses. The movement of the sensing masses, and consequently the movement of bellows 40a and 40b, thus effectively changes the volume of the chamber at the "outboard" side of the sensing mass (e.g., the portion of the chamber on the outside of the bellows) with respect to the chamber formed within the bellows on the "inboard" side, namely as one is decreased the other is increased. The respective chambers and cavities within the drive units 24 and 26 are filled with a suitable hydraulic fluid having appropriate material compatibility, stability, vapor pressure and temperature properties for a particular application, such as silicone oil, aircraft hydraulic fluid, brake fluid or the like. The outboard chambers, essentially chambers 34a and 34b, are coupled by conduits or hydraulic lines 42a and 42b and a passageway in the chamber housing to the slave units 28 and 30. The inboard chambers, that is the interior of bellows 40a and 40b, are coupled by hydraulic lines 44a and 44b and appropriate passageway in the chamber housing to the slave units 30 and 28. It is noted that in the illustrated embodiment of FIG. 2, the sensing masses 32a and 32b are shown at their extreme inboard position, which may be commensurate with the position at which the sensing masses would move to when subjected to a centrifugal force resulting from a roll rate which is below the desired operating range. It should also be noted that the sensing mases may be positioned at any desired position with respect to the desired or nominal roll rate and the slave units 28 and 30 suitably positioned with respect thereto, with the sensing masses most often being positioned at an intermediate location between the ends of chambers 34a and 34b at the nominal or desired roll rate at the same radial distance from the axis of rotation.

The sensing masses may be made of metals which are compatible with the hydraulic fluids used in the chambers and which are of high density so as to minimize the volume of the drive units needed, such as tungsten, uranium, or lead.

A drive unit which may be utilized for either units 24 or 26 is shown in cross section in FIG. 3. This drive unit includes a housing 46 which is adapted to movably receive sensing mass 32 and bellows 40, the portion in which sensing mass 32 is located having a larger inside dimension with a more restricted diameter portion surrounding bellows 40 to act as an inboard restraint or stop for sensing mass 32. The end of the housing 46 enclosing sensing mass 32, that is the larger diameter portion of housing 46, is sealed and enclosed by a cover plate 48 which in turn is locked and held in place by a suitable threaded coupler 50 and a flange extending from housing 46. The cover plate 48 also acts as a rest and support for a helical spring 52 which biases sensing mass 32 towards the inboard end of housing 46. The spring 52 is positioned within a recessed portion of sensing mass 32 which also communicates with the damping orifice 36. The bellows 40 is attached to and sealed at its outboard end against sensing mass 32 and its inboard end attached and sealed to an end support member 54 disposed over the inboard or restricted diameter portion opening of housing 46. A suitable end cover or plate 56 is threadedly engaged with housing 46 to form the complete enclosure of the chambers within housing 46. The enclosed space within bellows 40 and between bellows 40 and end plate 56 communicates with the hydraulic line 44 and forms the "inboard" chamber 38. The portion about the exterior of bellows 40 within housing 46 forms the "outboard" chamber 34 and communicates with the hydraulic line 42. As mentioned previously, all portions of the interior within housing 46 are filled with an appropriate hydraulic fluid. The sensing mass 32 is shown at a position slightly removed from its inboard stop formed in housing 46. In this embodiment, as the sensing mass responds to centrifugal forces by moving in the outboard direction, that is towards cover plate 48, the volume occupied by the bellows 40 in housing 46 will expand causing the fluid in the rest of the housing, namely chamber 34 to be displaced into hydraulic line 42, at the same time permitting additional fluid to be injected or flow into the correspondingly expanding chamber 38 from hydraulic line 44. This operation will be described more completely below.

The slave units 28 and 30 shown in FIG. 2 include bellows arrangements 58a and 58b which are driven by the displaced fluid from chambers 34a and 34b of the drive units. The bellows arrangements 58a and 58b are coupled by shafts or rods 60a and 60b in an appropriate manner to rotatable shafts 62a and 62b, which in turn are connected to the platforms 14a and 14b and fins 12a and 12b for rotation thereof. In addition, the rods 60a and 60b are coupled to additional bellows arrangements 64a and 64b which are coupled by hydraulic lines 44a and 44b to the chambers 38a and 38b of the opposite drive unit. Thus, as the sensing mass of the drive unit is forced outwardly by an increasing centrifugal force created by the rolling movement of body 10, the sensing masses displace fluid from the outboard chambers of the drive units to the bellows arrangements 58a and 58b causing the bellows therein to contract and move rods 60a and 60b. The movement of rods 60a and 60b will effect rotation of the fins 12a and 12b through shafts 62a and 62b and at the same time increase the size of the bellows in bellows arrangements 64a and 64b. This change in size of these bellows will drive fluid through conduits or hydraulic lines 44a and 44b to the chambers 38a and 38b respectively of the drive units. Thus, as fluid is displaced from one side of a drive unit to a slave unit, a corresponding amount of fluid is returned to the other side of the drive unit from the other slave unit and vice versa.

The bellows arrangements of the slave units are shown by way of example in greater detail in FIG. 4 wherein the bellows arrangement 58 is shown in partial cross section. The arrangement 58 includes an open-ended housing 66 having a piston 68 and bellows 70 disposed therein and sealed to each other and to the open end of the housing. The shaft 60 extends through the open end of housing 66 and is connected to piston 68. All portions within the housing surrounding piston 68 and bellows 70 are filled with the hydraulic fluid so that the displacement of fluid from one of the drive units through hydraulic line 42 will cause the piston 68 to be driven along housing 66 to the right in the drawing, and decrease the size of bellows 70. The bellows arrangement 64 is constructed in the same manner as arrangement 58 but in the reverse direction. It should be noted that the piston 68 may be provided with a fluid sealing ring and the bellows 70 eliminated to achieve a similar operation. The rod 60 is provided with a transverse bore 72 for coupling to crank 74 for actuation of shaft 62 of the fin, as shown in greater detail in FIG. 5.

In FIG. 5, the shaft 62 which rotates the platform 14 and fin 12 is coupled by a crank or other suitable lever arm 74 through a pin 76 to the transverse bore 72 in rod 60. As the rod 60 moves back and forth as driven by the bellows arrangements 58 and 64, the crank 74 rotates shaft 62 within a bushing and bearing mechanism 78. It will be apparent that other reciprocal to rotary motion conversion apparatus, such as rack and pinion gears and the like, may be utilized in place of the crank and rod arrangement shown. The fins and platforms may be formed of the same material as body 10 or they may be formed of a suitable metal or metal alloy for low energy trajectories or high temperature and ablative resistant material such as carbon, graphite or silicon fibers or composites of the aforementioned when appropriate for high energy trajectories. In order to minimize binding or other detrimental effects caused by the operating conditions of the systems, it may be desirable to position a ring 79 about and spaced from platform 14 which is made of the same material as the platform.

As the body 10 spins, the sensing masses 32 in the drive units 24 and 26 experience a centrifugaal force. The sensing masses react to the centrifugal force by moving outward and operating the attached bellows 40. The bellows restrain the movement of the masses, i.e., they act as springs, and displace hydraulic fluid from the chamber 34. The hydraulic fluid displaced by the sensing mass 32 movement and the bellows 40 expansion is driven through the hydrauic line 42 into bellows housing 58. To accommodate the hydraulic fluid from the drive unit, the bellows 70 must experience a change in length and in so doing, it moves rod 60. The rod 60, in turn, is connected to bell crank 74 which turns the fin 12. As all of the respective chambers are effectively coupled together in the drive units and slave units, the apparatus is essentially a constant-volume system. There is thus a direct relationship between the position of the sensing masses and the cant or angle of the fins. The ratio between sensing mass movement and fin cant travel may be changed by varying the areas of the respective bellows and/or by changing the length of the lever arm in the crank. The bellows arrangements 64 and the hydraulic connection to the inboard of the bellows in the opposite drive unit insure that the drive units, and therefore the fins, move in unison and makes the system insensitive to lateral accelerations. This arrangement averages the system parameters so as to average the fluid displaced by the respective masses since any movement of the bellows in the bellows arrangements 58 and 64 are identical. Because the bellows arrangements 64 are hydraulically coupled to the bellows 40 of the opposite drive unit, any movement of the sensing mass of one drive unit must be matched by the sensing mass of the other drive unit with the essentially non-compressible hydraulic fluid. If the system is subjected to a lateral acceleration directed along the diameter of the axis of the drive units, the inertial forces of the sensing masses cause high pressure to develop on the inboard end of one drive unit and on the outboard end of the other drive unit. These two high pressures work directly against each other at the interface between the bellows in the slave units and therefore do not affect the system. However, the magnitude of these pressures must be considered in designing the system. It may be appreciated that this system may be used to sense or control any rotary motion that is subject to accelerations normal to the axis of rotation.

Figure 7:
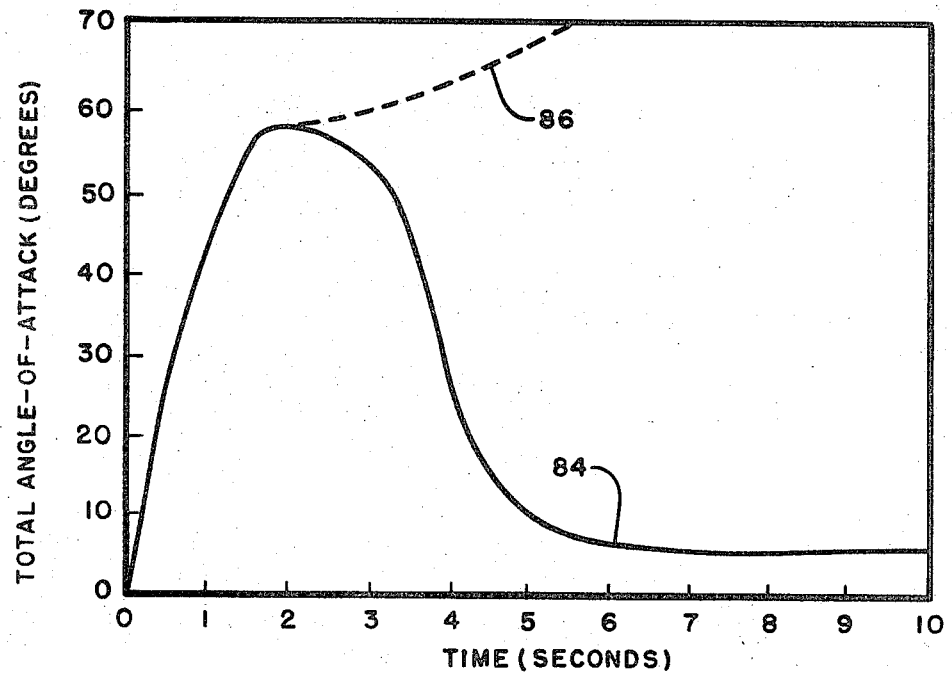
FIG. 7 is a graph of the angle of attack of a typical aerodynamic body subjected to this roll rate control system.

Such a roll rate control system was installed in a reentry vehicle having a cone half angle of about 10° and a base diameter of 15 inches and length of 42 inches with total weight of about 105 pounds. The vehicle was made with compound mass and inertia asymmetries sufficient to produce, in the absence of roll control, a sustained roll resonance instability by the inclination of the vehicle principle axis relative to its geometric center line and by displacing the center-of-mass. The sensing mass stroke in the drive units was set at one inch to produce fin cant limits of ±10° with a crank length of about 1.4 inches. The outside diameter of the drive unit bellows were about 0.8 inch while the slave unit bellows had an outside diameter of about 1.25 inches. Each of the sensing masses weighed about one pound and were 1.7 inches in diameter. The total roll rate control system weight was about 6 pounds. FIGS. 6 and 7 show the history of roll rate, pitch frequency and angle of attack of this reentry vehicle during a portion of its flight when the roll rate control system was in operation by curves 80, 82 and 84. Without the roll rate control, the angle of attack would follow curve 86 to angles as high as 50° to 90°. As can be seen from FIGS. 6 and 7, the roll rate control system maintained roll rate control precluding flight instabilities and causing the angle of attack to remain within acceptable limits.

By decreasing the sensing mass weights to about one-half pound and adjusting the crank diameter and bellows accordingly, a control system of about 4 pounds or less may be made.

What is claimed is:

1. A roll control system for an aerodynamics body having control fins extending therefrom comprising first and second rotatable means carried by said body at opposite ends of a diameter for rotatably supporting respective first and second of said fins for changing their orientation with respect to said body; actuator means for each of said fin supporting means, each actuator means including a housing having two chambers together with fluid responsive means for increasing the size of one of said chambers simultaneously with decreasing the size of the other chamber together with a mechanical means interconnecting said fluid responsive means and said fins for rotating said fins with said chamber size variation; fluid displacing means including first and second housings carried by said body, with each housing having a sensing mass dividing said housings into inward and outward portions and movable generally radially thereof in opposite directions inwardly and outwardly along a radius of said body in response to centrifugal force acting on said body for displacing fluid proportional to said centrifugal force from said inward and outward portions of said housings, and means for biasing said sensing masses to initial positions within said housings; coupling means including conduits for hydraulically interconnecting the outward portions of each of said fluid displacing means housings to a chamber of a separate one of the actuator means housing and the inward portion of each of said fluid displacing means housings to the other chambers of the opposite actuator housing means to provide an essentially constant-volume in each interconnected actuator means housing chamber, fluid displacing means housing portion, and conduit during sensing mass movement for rotating said first and second fins proportional to said fluid displacement and said centrifugal force; and an essentially noncompressible fluid filling each of said chambers, housing portions and conduits.

2. The control system of claim 1 wherein said sensing mass movement and fluid displacement in one of said fluid displacing means housing portions causes the chamber of one of said actuators coupled therewith to expand while the other chamber of said one actuator is simultaneously decreasing and displacing fluid to a portion of the other fluid displacing means housing.

* * * * *